June 15, 1954

O. H. SCHMITT ET AL 2,681,264

POLAR RECORDING SYSTEM

Filed Oct. 16, 1948

INVENTORS
OTTO H. SCHMITT
WESLEY A. FAILS
BY WINFIELD E. FROMM
FREDRICK R. BARNES.
Blair Curtis & Hayward
ATTORNEYS June 15, 1954

O. H. SCHMITT ET AL 2,681,264

POLAR RECORDING SYSTEM

Filed Oct. 16, 1948

INVENTORS
OTTO H. SCHMITT.
WESLEY A. FAILS
WINFIELD E. FROMM
BY FREDRICK R. BARNES.

Blair Curtis & Hayward.
ATTORNEYS

June 15, 1954

O. H. SCHMITT ET AL 2,681,264

POLAR RECORDING SYSTEM

Filed Oct. 16, 1948

INVENTORS
OTTO H. SCHMITT
WESLEY A. FAILS.
BY WINFIELD E. FROMM
FREDRICK R. BARNES.

Blair Curtis & Hayward
ATTORNEYS

Patented June 15, 1954

2,681,264

UNITED STATES PATENT OFFICE 2,681,264

POLAR RECORDING SYSTEM

Otto H. Schmitt, Minneapolis, Minn., and Fredrick R. Barnes, Westbury, Wesley A. Fails, East Hempstead, and Winfield E. Fromm, East Williston, N. Y., assignors to Airborne Instruments Laboratories, Inc., Mineola, N. Y.

Application October 16, 1948, Serial No. 54,962

4 Claims. (Cl. 346—112)

This invention relates to methods of and apparatus for recording electrical data in a continuous polar coordinate plot, and more particularly to a system for measuring and recording on a polar plot the relative strength of a radio frequency signal as a function of the angle of an antenna relatively to the direction of propagation of the radio signal.

The present system is useful for many applications where data is to be automatically recorded. A typical use of the invention is in connection with the measurement of the field pattern, i. e., the directional characteristics, of a radio antenna, for example, a radio antenna mounted upon a marine vessel or aircraft. Actual application of the present system will be made more clear by referring to the copending applications Serial No. 29,018, filed May 25, 1948, by Otto H. Schmitt et al., now U. S. Patent No. 2,556,556, issued June 12, 1951, and Serial No. 781,616, filed October 23, 1947, by Otto H. Schmitt et al., now U. S. Patent No. 2,602,924, issued July 8, 1952, of which this application is a continuation-in-part.

In accordance with the present invention a highly versatile recording system is provided which is capable of recording electrical data, or other data which can be represented by electrical values, and which is capable of responding to rapidly changing values without overshooting or hunting. The entire system is arranged in a form convenient for use in a wide variety of applications and is provided with an internal switching arrangement whereby the system can be converted quickly for use with various types of electrical signals.

The invention is described as embodied in an arrangement for plotting the field pattern of an antenna mounted on a ship which is positioned within a substantially uniform portion of a field or beam of radio frequency radiation. The entire craft with the antenna is rotated while the relative amplitude of the radio frequency signal induced in the antenna is measured and the data recorded automatically on a continuous coordinate plot whereof the argument, or angle of the radius vector represents azimuth, or bearing, and its modulus, or amplitude represents signal strength.

Accordingly, it is an object of this invention to provide an improved system for plotting electrical data automatically and accurately in polar coordinate form.

Another object is to provide such a system capable of rapid response and having minimum overshoot and hunting characteristics.

Still another object is to provide in such a system coordinated arrangements for enhancing the utility and convenience of the apparatus and the application thereof to diversified uses.

Still another object is to provide improved novel components, circuits and arrangements of particular use in this system, but readily adaptable for use in other systems and applications.

These and other objects will be in part apparent from, and in part pointed out in, the following description taken in conjunction with the accompanying drawings in which.

Figure 1:
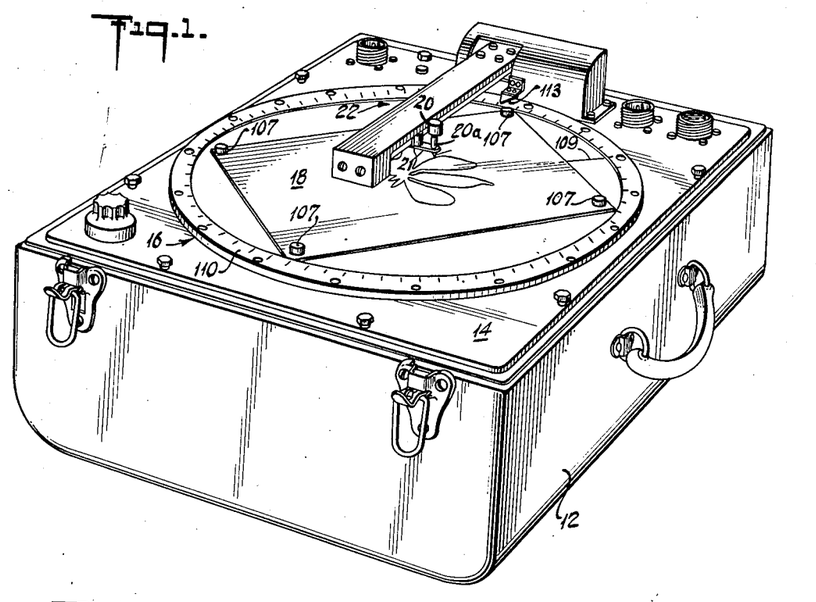
Figure 1 is a perspective view of the polar recorder unit of a system embodying features of this invention.

As may be seen in Figure 1, the polar recorder unit of the system comprises a case 12 having a removable upper panel 14 upon which is rotatably mounted a turntable 16. A sheet 18 upon which the polar coordinate plot is to be drawn is placed upon the turntable, and rotates with it in conformity to the angular coordinate of the data to be recorded. A pen 20 is removably supported for contact with the sheet 18 by means of a pen arm 22 mounted parallel to the radius of turntable 16 and sheet 18, the pen 20 being arranged to move longitudinally along the pen arm and radially of turntable 16 in accordance with the amplitude coordinate of the data.

Pen 20 is supported for limited vertical reciprocation in a conforming opening in an arm 21 extending laterally from carriage 24, and is urged against sheet 18 with a pressure no greater than the weight of the pen and the ink therein. A capillary tube in the lower portion or neck 20a of pen 20 allows flow of ink from pen 20 to sheet 18 for the drawing of inked lines on sheet 18 as the pen and sheet are moved relatively of each other.

Figure 2:
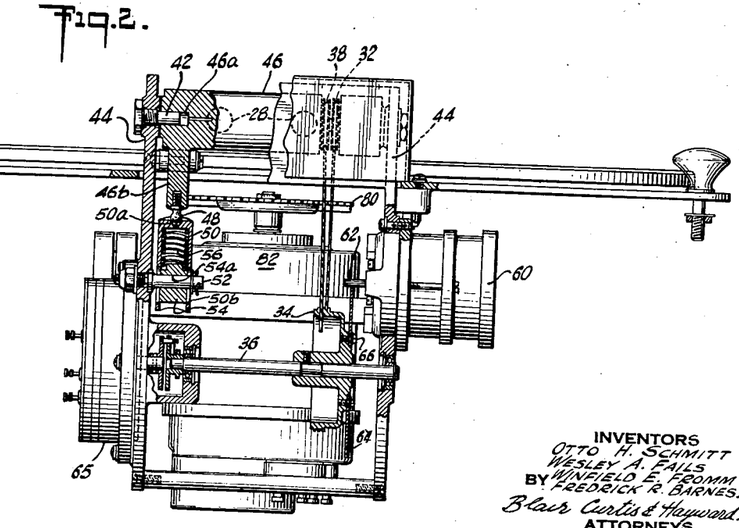
Figure 2 is a vertical section through the polar recorder in the vicinity of pivot of the pen arm.
Figures 3, 4:
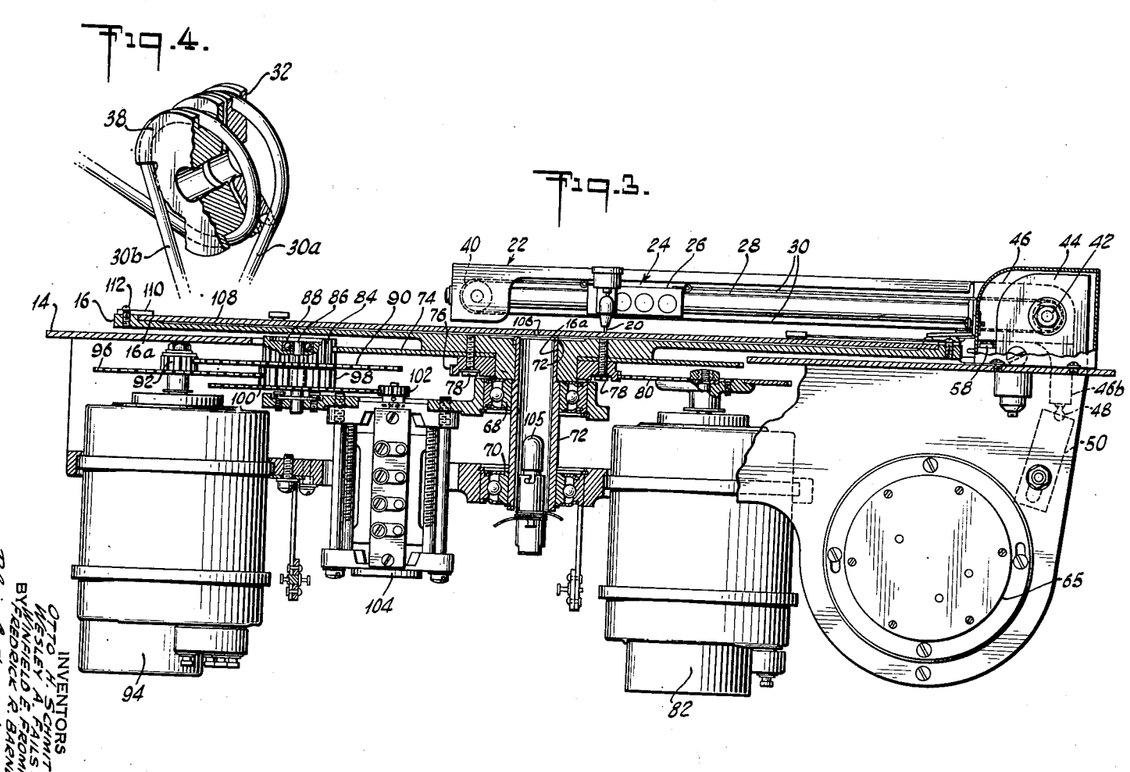
Figure 3 is a vertical section taken generally along line 3—3 of the recorder.
Figure 4 is an enlarged perspective view of the pulley mechanism at the pivotal axis of the pen arm.

As shown more clearly in Figure 3, the pen 20 is supported by a carriage 26, which is in the form of a rectangular box having a pair of openings at each end through which two rods or rails 28 extend to support the carriage 26 for movement longitudinally of the pen arm 22. In order that the sheet 18 can be removed or replaced conveniently, the pen arm 22 is pivotally supported, as will be described so that it can be rotated upwardly from the turntable 16. The radial movement of carriage 26 is imparted by means of a cable 30, the ends of which are attached to opposite ends of carriage 26. From the right-hand end of carriage 26, as seen in Figure 3, cable 30 extends along the pen arm 22 over a sheave 32 (Figures 2 and 4), which is mounted coaxially with the pivot of the pen arm 22, and downwardly around a drum 34 which is secured to a driven shaft 36 rotatably supported within the recorder unit. Cable 30 extends around drum 34 for several turns, then extends upwardly around another sheave 38, also mounted coaxially with the pivot of the pen arm 22, and forwardly along the pen arm, around a pulley 40 at the forward end thereof and thence to the left-hand end of carriage 26. The cable 30 is secured for positive engagement with drum 34, so that rotation of drum 34 will shorten one end of cable 30 while lengthening the other, to cause movement of carriage 26 and the associated parts of the recording head longitudinally of the pen arm and radially of turntable 16.

To prevent stressing or slackening of cable 30 when the pen arm 22 is tilted upwardly from the turntable 16, the cable is passed around the sheaves 32 and 38 in the manner shown in Figure 4. Thus, the cable passes in opposite directions around the two sheaves so that when pen arm 22 is lifted, portion 30a of cable 30 is lengthened, while portion 30b is shortened by an equal amount so that the cable is neither stressed nor slackened. Since the portion 30b of the cable extends over sheave 38 for almost a full turn, sheave 38 is slightly wider than sheave 32 to allow for the thickness of the cable.

The pen arm 22 is supported for pivotal movement at its rearward end by means of studs 42 (Figures 2 and 3) which project through upright tabs 44 on the frame of the recorder into recesses 46a in a crossbar 46 which is secured to the rearward ends of rods 28 and constitutes a transverse framing member for pen arm 22.

In order to maintain the arm 22 in either its recording or upward position, a toggle mechanism is provided. An arm 46b extends downwardly from one end of crossbar 46 and a ball member 48 is secured to the lower end of this arm 46b. Ball 48 is received in a socket 50a in the upper end of a cylinder 50, which is pivotally supported upon a stud 52 projecting through a pair of longitudinal slots in opposite sides of cylinder 50. A cylindrical block 54 is positioned within cylinder 50 and has an opening 54a which is likewise traversed by stud 52. Between the upper end of block 54 and the upper end of the interior of cylinder 50 is compressed a coil 56, this biases the cylinder 50 and arm 46b to either side of a line adjoining the axis of stud 52 and the pivotal axis of the pen arm 22, and causes the pen arm to seek either a downward position as shown in Figure 3, or an upright position. The downward travel of pen arm 22 is limited by means of an adjustable stop 58 (Figure 3) which is adapted to engage the under side of crossbar 46, and the upward travel of the arm is suitably limited by another limit member (not shown). In its lower position pen arm 22 is parallel to the upper surface of the turntable and in position for recording, while in its upward position it forms an acute angle with the turntable sufficient to permit easy removal or replacement of the sheet 18.

The carriage 26 with its recording pen 20 is driven through the cable 30 and drum 34 by means of a servomotor 60 (Figure 2). A pinion 62 on the shaft of servomotor 60 meshes with a large spur gear 64 secured to drum 34 by means of screws 66; the ratio of teeth between pinion 62 and spur gear 64 affords suitable reduction in drive speed between servomotor 60 and drum 34. Servomotor 60 is supplied power, by means to be described hereinafter, to cause pen 20 to assume a radial position in accordance with variations in the appropriate coordinate of the data to be recorded. A follow-up potentiometer 65 (Figure 2) is ganged for rotation with the drum 34 and is connected in the electrical circuit, as will be described below.

As may be seen in Figure 3, turntable 16 is supported rotatably with respect to panel 14 of the recorder by means of ball bearings 68 and 70 whose outer races are secured to the frame of the recorder and whose inner races encircle a bearing sleeve 72 whose upper end is received in an axial opening 16a in turntable 16 and rigidly supported with respect thereto, for example, by riveting or swaging as at 72a.

To provide for driving of the turntable 16, and control of its position, a large spur gear 74 and a smaller spur gear 76 are secured to the turntable by means of screws 78. The smaller gear 76 meshes with another spur gear 80 of equal size which is affixed to the rotor of a selsyn transformer 82, so that the rotor of selsyn transformer 82 makes one revolution for each revolution of the turntable. Gear 74 meshes with a pinion 84 which is rotatably supported upon a fixed shaft 86 by means of a ball bearing 88. Fixed to pinion 84, and also rotatably supported upon shaft 86, is a spur gear 90 which meshes with a pinion 92 affixed to the rotor of a second selsyn transformer 94. The ratio of teeth in the train of gears 74, 84, 90 and 92 is such that the rotor of selsyn transformer 94 will make thirty-six revolutions for each revolution of the turntable.

In order to simplify the mechanical arrangement and eliminate unnecessary gearing, this same gear train is employed to drive the turntable 16. Thus, fixed to pinion 92 and to the rotor of selsyn transformer 94 is a spur gear 96 which meshes with a pinion 98 rotatably supported upon shaft 86 in like manner as is pinion 84. Fixed to pinion 98 is a spur gear 100 which meshes with a pinion 102 fixed to the shaft of a servomotor 104. The ratio in the gear train 102, 100, 98, 96, et seq. affords a substantial reduction between servomotor 104 and turntable 16.

Servomotor 104 is supplied power, by means which will be described hereinafter, to effect rotation of turntable 16 to different angular positions in accordance with variations in the appropriate coordinate of the data to be recorded. This rotation of turntable 16, as has been described, also involves rotation of selsyn transformers 82 and 94 at 1:1 and 36:1 ratios, respectively.

The recorder is usually employed in connection with recording sheets which bear coordinate reference markings, for example, sheets of polar graph paper. It is important that the sheets be positioned so that the center or origin of the graph will coincide precisely with the center of rotation of the turntable 16, and the zero position of pen 20. It has not been found generally satisfactory to rely upon either the edges or the center of the sheet of paper as a guide in such centering, for the reason that the reference lines upon the sheet are not always in precisely the same position with respect to the edges or center of the sheet, and because of dimensional changes in the paper with various conditions of humidity. In the present recorder, this difficulty is overcome by directing a pin-point beam of light upwardly from the exact center of turntable 16, so that, when a translucent sheet is placed upon turntable 16 this tiny beam of light will be visible through the sheet, and the sheet may be rapidly positioned so that the origin or axis of its reference lines are accurately aligned with the center of the turntable. To this end, a small incandescent lamp 105 is positioned within sleeve 72, and a minute opening 106 is provided at the center of the turntable 16. In order to secure the paper in position on the turntable 16, which is constructed at least partially of ferro-magnetic material, such as steel, a plurality of small permanent magnets 107 are provided, which are placed upon the upper surface of the sheet 18, as shown in Figure 1.

When the present recording system is used in conjunction with a conventional marine gyroscope system corrected to true north, the angular position of turntable 16 will be such that zero position of the turntable will correspond to true north. However, in many cases it will be desirable that the zero reference line on the record sheet correspond to some other direction, for example, to the direction of the source of the radio frequency field which is to be measured. To achieve this correction, the record sheet 18 may be rotated so that its line of zero angle does not correspond to that of the turntable. To assist in rapidly and accurately orienting the sheet, the turntable 16 is provided with a rotatable disc 108 (Figure 3) upon which is inscribed a radial line 109 (Figure 1) which serves as a reference line in orienting the record sheet. Disc 108 is received within a recess 16a (Figure 3) in turntable 16 and is slidably retained therein by means of a ring 110 which is secured to turntable 16 by means of screws 112. Ring 110 is inscribed, as shown in Figure 1, with a scale marked in degrees, the zero point of such scale corresponding to the zero position of the turntable. The reference line 109 on disc 108 intersects this scale, so that the angular position of reference line 109 with respect to the turntable may be accurately established, the position of the turntable being indicated by a pointer 113 (Figure 1). In use, disc 108 is rotated so that reference line 109 intersects the scale of ring 110 at an indicated angle appropriate to compensate for the azimuthal displacement of the source of the radio frequency energy, for example, from true north, or for other application, the graph sheets can be placed conveniently in any other predetermined position.

Figure 5:
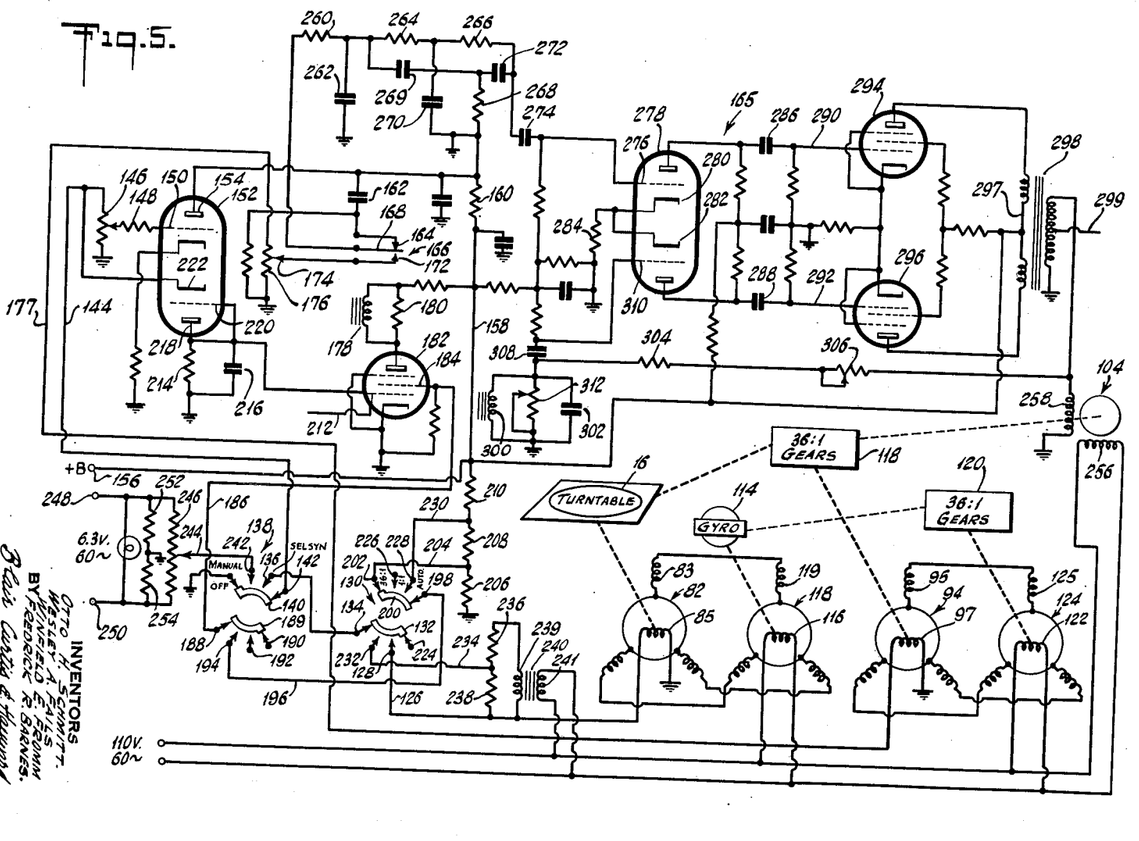
Figure 5 is a schematic diagram of the turntable servo amplifier and associated circuits.

Figure 5 illustrates the circuits associated with the turntable driving mechanism and which are to furnish power to servomotor 104 for driving turntable 16 to a position dependent upon the signals induced in selsyn transformers 82 and 94. This apparatus will be referred to collectively as the turntable servo amplifier. In Figure 5, the turntable servo amplifier is shown connected for use in conjunction with a directional gyro repeater system in which the gyro 114 is mechanically linked at 1:1 ratio with the rotor 116 of selsyn transformer 118 and through a 1:36 ratio reduction gear train 120 to the rotor 122 of a second selsyn transformer 124, so that rotor 122 makes 36 revolutions for each revolution of gyro 114—in other words, each time the craft in which the gyro is mounted traverses a complete circle, the rotor 116 will make one revolution and rotor 122 will make 36 revolutions.

The rotors 116 and 122 each are connected to a source of A.-C. power, for example, 110-volt, 60-cycle. Thus, there will be induced in the three stator windings of the selsyn transformers 118 and 124 voltages of different amplitude, depending upon the rotational position of the rotors 116 and 122, as is well understood in the art.

The three stator windings 119 of selsyn transformer 118 are connected to corresponding stator windings 83 of the 1:1 selsyn transformer 82, which is mounted within the polar recorder case 12. In like manner, the three stator windings 125 of the 36:1 gyro selsyn transformer 124 are connected to corresponding stator windings 95 of the 36:1 selsyn transformer 94, which is mounted within the polar recorder case 12.

The rotor 85 of the 1:1 turntable selsyn transformer 82, as was previously mentioned, is connected to rotate with the turntable 16 in 1:1 ratio and the rotor 97 of the 36:1 turntable selsyn transformer is coupled to the turntable through the 36:1 gear train, indicated diagrammatically at 118, so that rotor 97 rotates at a 36:1 ratio with the turntable. This system is arranged so that when the turntable is in the same relative position as the gyro 114, the rotors 85 and 116 are likewise in the same relative positions, as are the rotors 97 and 122. Under such conditions, the voltages induced in the stator windings 119 of the 1:1 gyro selsyn transformer, and connected to the stator windings 83 of the 1:1 turntable selsyn transformer 82, create a field within the transformer such that no voltage is induced in the rotor 85 of the latter transformer. The same is true with respect to the 36:1 selsyn transformer circuit—that is, no signal will be induced in the rotor 97 of the 36:1 turntable selsyn transformer. When, however, the turntable is not in the same relative position as the gyro, voltages or "error signals" will be induced in the rotors 85 and 97.

The error signals in the rotors 85 and 97 are fed to the turntable servo amplifier which applies operating voltage to servomotor 104 causing it to drive turntable 16 toward the same relative position as the gyro, thus, reducing the error signals to zero. In the simplest system—that is, where only 1:1 ratio selsyn transformers are provided, the angular accuracy is somewhat restricted. However, by using 36:1 ratio selsyn transformers, a theoretical gain of 36:1 in overall accuracy is obtainable. With this arrangement, the 1:1 selsyn transformer controls the operation system to align the slave rotor to within a few degrees of the master rotor, at which point control of the system is transferred to the 36:1 selsyn transformers for bringing the system into final alignment.

In the present servo amplifier, means are provided for shifting control automatically from the 1:1 to the 36:1 selsyn transformers when the slave rotor is within a predetermined angular displacement from the master, for example, three degrees. Means are provided also for shifting control between the 1:1 and 36:1 selsyn transformers manually, as well as for preventing control by either pair of selsyn transformers so that manual control of the angular position of the turntable can be exercised.

As can be seen in Figure 5, the ungrounded end of the rotor 85 of the 1:1 turntable selsyn transformer is connected through a line 126 to a fixed contact 128 of a two-section rotary selsyn control switch 130, having three positions: "36:1," "1:1," and "selsyn." Contact 128 is adapted to be engaged by the rotary arm 132 of this section when the switch is in its 1:1 position. The rotary arm 132 is connected through a wiping contact 134 to a fixed contact 136 of a two-section, operation-control rotary switch 138 having three positions: "off," "manual," and "selsyn." Contact 136 is adapted to be engaged by a movable arm 140 of switch 138 in the selsyn position. This rotary arm 140 of switch 138, is connected through a wiping contact 142 and a line 144 to one end of a potentiometer 146 whose opposite end is grounded and whose sliding contact is connected through a series resistance 148 to a control grid 150 of one section of a dual triode vacuum tube 152.

The plate 154 of this section of tube 152 is connected through a plate load resistor 160, line 158, and terminal 156 to a source of positive voltage (not shown). The voltage developed across this resistor 160 is coupled through a condenser 162 to a fixed contact 164 of a single-pole, double-throw relay 166, which switches the control from the 1:1 to the 36:1 selsyn system. The armature 168 of relay 166 is connected to the servo amplifier circuits, which will be described presently, and its position controls the input to these circuits. When armature 168 is in engagement with contact 164, the error signal in the 1:1 selsyn transformer, amplified by tube 152, will be connected to the input of the servo amplifier, generally indicated at 165, so that the 1:1 selsyn transformer will be effective to control servomotor 104 and the turntable 16.

In its lower position, armature 168 engages a fixed contact 172 which is connected to the sliding contact 174 of a potentiometer 176, the ungrounded end of which is connected through a line 177 to the ungrounded end of the rotor 97 of the 36:1 turntable selsyn transformer. Accordingly, in its lower position, armature 168 is effective to connect the error signal from the 36:1 selsyn transformer directly to the input of the servo amplifier so that this transformer controls the servomotor 104 and turntable 16.

Relay 166 is actuated by a solenoid 178, which is connected in parallel with a resistor 180 in the plate load circuit of a pentode type vacuum tube 182. When the current to the plate of tube 182 through solenoid 178 rises to a predetermined level of solenoid 178 is energized to attract the armature 168 of relay 166 and connect the servo amplifier to the rotor 97 of the 36:1 turntable selsyn transformer 94. When, however, the plate current of tube 182 drops below such predetermined level, solenoid 178 releases armature 168, so that relay 166 connects the input of the servo amplifier to rotor 85 of the 1:1 turntable selsyn transformer 82. To control the operation of this tube 182, its screen grid 184 is connected through a lead 186 to a wiping contact 188 in the lower section of control switch 138. The fixed contacts 190 and 192 of this section of switch 130, which contacts correspond, respectively, to the off and manual positions, are blank contact, so that tube 182 draws no plate current in these positions. The fixed contact 194 which corresponds to the selsyn position of switch 138, however, is connected through a lead 196 to the wiping contact 198 in the upper section of the selsyn control switch 130. In the 36:1 position of switch 130, the rotary arm 200 of this section of the switch engages a fixed contact 202 which is connected through a line 204 to a junction between two resistors 206 and 208, which form a part of a voltage divided network of resistors 206, 208 and 210 connected between the lead 158, from the positive voltage supply terminal 156, and ground. Accordingly, when the operation-control switch 138 is in the selsyn position and the selsyn control switch 130 is in the 36:1 position, the positive voltage developed at the junction of resistors 206 and 208 in the voltage divider network is applied to the screen grid 184 of tube 182. The control grid 212 of tube 182 is connected to the plate 218 and control grid 220 of the remaining section of tube 152. This section of tube 152 is connected as a diode or rectifier, with its plate 218 and grid 220 grounded through a load circuit comprising a resistance 214 in parallel with a capacitance 216. The cathode 222 of this section is connected through the lead 144 to the wiping contact 142 of the selsyn control switch 138. As has been described, when switch 138 is in its selsyn position, connection is made through the wiping contact 142, rotary arm 140, and fixed contact 136 to the wiping contact 134 of the lower section of selsyn control switch 130. When switch 130 is in its 36:1 position, the rotary arm 132 of its lower section is in engagement with fixed contact 224 which contact is blank. Accordingly, with switch 130 and 138 so positioned, no signal will be applied to the cathode of the lower section of tube 152, and accordingly, no voltage will be developed across the load resistor 214, and the grid 212 of tube 182 will be at ground, or cathode potential. With zero bias on its control grid 212, and suitable voltage on the screen grid 184, tube 182 will conduct sufficient current to energize relay winding 178, holding relay 166 in its lower or 36:1 position.

When selsyn selector switch 130 is rotated to its 1:1 position, the rotary arm 200 of its upper section is in engagement with the blank fixed contact 226, so that no voltage is applied to the screen grid 184 of tube 182 and the tube is nonconducting; this deenergizes winding 178 and releases relay 166 to its upper or 1:1 position.

At the same time, as has been described, the lower section of switch 130 is effective to connect rotor 85 of the 1:1 turntable selsyn transformer through contacts 136 and 142 of the upper section of switch 138, and line 144 to the control grid 150 of tube 152.

In the "automatic" position of switch 130, the rotary arm 200 of its upper section is in engagement with the fixed contact 228 which is connected through the line 230 to the junction of resistors 208 and 210 in the voltage divider network. The voltage developed at this point is of a higher positive value than that developed at the junction of resistors 206 and 208, so that with switch 130 in the "automatic" position the voltage applied through the wiping contact 198, and the lower section of switch 138 to screen grid 184 of tube 182 is of somewhat higher positive value than when switch 310 is in the 36:1 position, as above described. With such voltage upon its screen grid 184, tube 182 will conduct sufficiently to hold relay 166 in the 36:1 position, provided there is no appreciable negative bias applied to its control grid 212.

In this same "automatic" position of switch 130, however, the cathode 222 of the lower section of tube 152 is connected through the upper section of switch 138 and the lower section of switch 130 to a fixed contact 232 in the lower section, which in turn is connected through a line 234 to the junction of a pair of resistors 236 and 238 which parallel a secondary winding 239 of a null-transformer 240, whose primary 241 is connected to the 110-volt 60-cycle power source. One end of the winding 239 is connected to the lead 126 from the rotor 85 of the 1:1 turntable selsyn transformer 82. Thus, an alternating voltage, developed across resistor 238 by transformer 240, is added to the signal from rotor 85 in this condition of operation; the purpose of this voltage will be explained later in connection with the operating characteristics. Accordingly, with selsyn circuit switch 130 in the automatic position, the error signal induced in the rotor 85 is connected to the cathode 222 of tube 152 and this A.-C. voltage is rectified by the lower section of the tube to develop a negative D.-C. voltage across the load resistor 214, proportional to the amplitude of the error signal. This negative voltage is applied to the control grid 212 of tube 182 to prevent the flow of substantial plate current so long as the error signal is appreciable; that is, so long as there is a substantial relative angular displacement between the turntable 16 and gyro 114, relay 166 will remain in its "1:1" position.

As turntable 16 approaches zero relative displacement, the error signal induced in rotor 85 will diminish in amplitude, as will the negative voltage developed across the load resistor 214, which is applied to the control grid 212 of tube 182. The circuit constants are chosen so that tube 182 will conduct sufficient current to shift relay 166 to its 36:1 position when the relative angular displacement of turntable 16 is less than three degrees.

In the manual position of selsyn control switch 138, the rotary arm 140 of its upper section engages a fixed contact 242 which is connected to sliding contact 244 of a potentiometer 246 which is connected, through the terminals 248 and 250, to an external 6.3-volt 60-cycle power source (not shown). A pair of resistors 252 and 254 also are connected in series across terminals 248 and 250 and their junction is grounded so that the voltages at opposite ends of potentiometer 246 are of equal voltage and opposite polarity with respect to the ground, i. e. are displaced 180° in phase. With switch 138 in the manual position, voltage at the slide contact 244 of potentiometer 246 is connected through the line 144 to the control grid 150 of the upper section of tube 152. This voltage is amplified by tube 152 and applied, as previously described, to the upper contact 164 of relay 166. In the same position of switch 138, the rotary arm 189 of the lower section of the switch is in engagement with the blank contact 192 so that no voltage is applied to the screen grid 184 of a relay control tube 182 and relay winding 178 is deenergized, and the voltage selected by manual control of potentiometer 246 is amplified by tube 152 and applied to the servo amplifier 165 to drive servomotor 104. Thus, by adjustment of sliding contact 244, to select either "in-phase" or "out-phase" voltages of the desired amplitude, the two-phase servomotor 104 is connected across the source of 110-volt 60-cycle power, and the other field winding 258 of servomotor 104 is supplied a voltage of the same frequency in phase quadrature with the voltage applied to field 256. If the voltage of field 258 leads that of field 256 by 90 degrees, servomotor 104 will be driven in one direction, and if the voltage of field 258 lags that of field 256 by 90 degrees, servomotor 104 will be driven in the opposite direction.

The voltage in winding 258 is derived from the same 110-volt 60-cycle source as that in the winding 256, and either is in phase with such voltage, or displaced 180 degrees therefrom, depending upon the angular position of the rotor of the selsyn transformer in use. In order, therefore, to render this voltage effective, when applied to winding 258, to cause rotation of servomotor 104, its phase must be shifted by 90 degrees. This phase shift is accomplished by the network indicated generally at 170. The network comprises two stages, the first consisting of a resistor 260 and a condenser 262; this section of the network is effective to shift the phase of the voltage 30 degrees. The second section of the network, consisting of resistors 264, 266, and 268, and condensers 269, 270 and 272, is effective to shift the phase of the voltage through the remaining 60 degrees. The latter section of the network is tuned to 180 cycles, and accordingly functions to suppress any third harmonic components of the signal.

The signal, after passing from the relay 168 through the network 170 is coupled through a condenser 274 to a control grid 276 of a voltage amplifier tube 278. Tube 278 is a dual triode tube, the lower section of which is connected as a phase inverter. The cathodes 280 and 282 of the two sections have a common cathode resistance 284. As the voltage impressed upon the grid 276 goes positive, the upper section of tube 278 draws more current and increases the voltage drop across the cathode resistance 284, thus biasing the cathode of the lower section more positive and decreasing the conductance of the lower half of the tube, so that the upper and lower sections of tube 278 work in push-pull fashion. The signals developed at the plates of these tubes are coupled through condensers 286 and 288, respectively, to control grids 290 and 292 of a pair of power amplifier tubes 294 and 296 which are connected in push-pull. The plate load of these tubes comprises the primary winding 297 of an output transformer 298 whose secondary winding 299 is connected between the winding 258 of servomotor 104 and ground. Accordingly, the error signal after being amplified and shifted in phase is used to drive servomotor 104 to rotate turntable 16 and its selsyn transformer rotor until the error signal is reduced to zero—in other words, until the position of the turntable 16 corresponds to that of the gyro 114.

Because of the inertia of the system there is a tendency to overshoot the point of zero error signal, which tends to produce an oscillatory or "hunting" motion of the servomotor 104 and the turntable about the zero position. To overcome this tendency, a resonant inverse feedback circuit is utilized to apply a reverse voltage to the servomotor the instant it passes the zero position. To this end, a parallel circuit, resonant at 60 cycles, is provided consisting of an inductance 300 and a condenser 302. One side of the circuit is connected to ground and its other side is connected through a fixed resistance 304 and a variable resistance 306 to the winding 258 of servomotor 104. This latter side of the tuned circuit is connected also through a condenser 308 to the grid 310 of the lower section of the phase inverter tube 278. During the time that the servomotor 104 is being driven toward its zero position, the voltage in its winding 258 is applied through resistances 304 and 306 and condenser 308 to the grid 310 of tube 378, where it constitutes an inverse feedback voltage. As servomotor reaches its zero position, the error voltage is reduced to zero so that voltage in the servo amplifier is no longer applied to winding 258 of servomotor 104. However, the resonant circuit 300, 302 continues to oscillate for a brief time after the voltage applied to winding 258 vanishes, so that the inverse signal applied to grid 310 of the phase inverter tube 278 will be amplified by this tube and the power amplifier 294, 296 and applied to winding 258 resulting in the development of a reverse torque in the servomotor 104, thus tending to prevent any overshoot. A variable resistance 312 is connected across the resonant circuit 300, 302, to allow for variation of the Q of the circuit to control the damping effect of the circuit.

Figure 6:
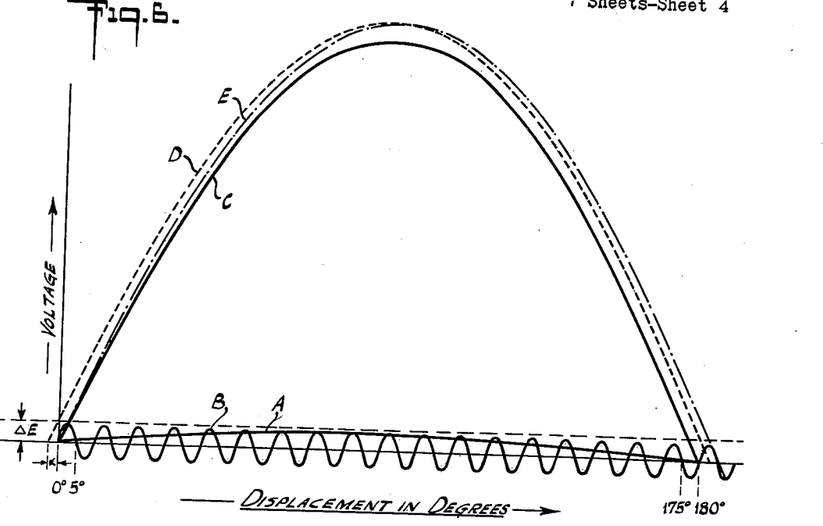
Figure 6 is a plot of variations in amplitude of the signals induced in the rotors of the turntable selsyn transformers with rotation of said rotors.

In order to permit this same resonant feedback system to be used in connection with both the 1:1 and 36:1 selsyn transformers, some corrective action must be taken because the desired damping will be dependent upon the rate of change of the voltage applied to winding 258 as the servomotor 104 approaches zero position, and the slopes of the error signals induced in these two transformers near the zero point are not equal. Figure 6 is a plot of the amplitude of the error signals induced in the rotors 85 and 97 of the turntable selsyn transformers as the turntable is rotated through 180 degrees to its zero position. Curve A represents the error signal of the 1:1 turntable selsyn transformer 82 and corresponds to 180 degrees of a sine wave; however, as the rotor of the 36:1 selsyn transformer 94 has made 18 complete revolutions, the curve B, representing the error signal induced in this rotor, will constitute 18 cycles of sine wave. The slopes of these curves near zero are quite different. To overcome this difference and allow the resonant feedback circuit to function equally well in either case, the error signal in the 1:1 transformer is amplified to a relative amplitude indicated by curve C. This amplification is accomplished in the upper section of tube 152 as previously described; the error signal induced in the rotor 97 of the 36:1 selsyn transformer being applied directly, without amplification, to the contact 172 of relay 166.

The slopes of the curves B and C near zero, are now approximately equal. It may be seen, however, that their slopes near the 180 degree mark are opposite in direction. Assuming that a positive error signal causes rotation of servomotor 104 and of the selsyn motor in a negative direction as shown in Figure 6, if the displacement of the selsyn rotor of the turntable approaches 180 degrees so that control is automatically transferred to the 36:1 selsyn, the error signal induced at this selsyn will be such as to cause the turntable to "lock-in" at 180 degrees rather than at zero.

To overcome this, a voltage ΔE is added to the voltage induced in the 1:1 selsyn rotor to produce the curve D. Also, the 1:1 selsyn rotor is mechanically displaced through an angle α to produce the curve E. It may be seen that the curve E has substantially the same slope as the curve B near both the zero degrees and 180 degree positions. Thus, the system will not lock in except at the correct position.

The voltage ΔE is developed across resistor 238 (Figure 5), which forms with resistor 236, the voltage divider network across the secondary winding of the null-transformer 240. In the automatic position of the selsyn control switch 138 the voltage applied to the grid of the 1:1 amplifier tube 152 is the sum of the error signal induced in the rotor 85 of the 1:1 selsyn transformer 82 and the voltage developed across resistor 238.

In operation, switch 138 selects the desired control for turntable 16. With switch 138 in its manual position, the position of the turntable can be controlled by adjustment of the potentiometer 246. In the selsyn position of switch 138, control of the turntable depends upon the setting of the selsyn control switch 130. With the latter switch in its 36:1 position, the 36:1 transformer controls the position of the table, however, for usual conditions of operation this position of switch 130 is not used because the 36:1 selsyn transformer can lock at any 10 degrees of rotation of the turntable. With the switch 130 in its 1:1 position, control of the turntable is accomplished by the 1:1 selsyn transformer. In the automatic position of switch 130, the 1:1 selsyn transformer controls the turntable until it is within 3 degrees of its position of zero displacement at which time the control is transferred automatically to the 36:1 selsyn transformer.

Figure 7A:
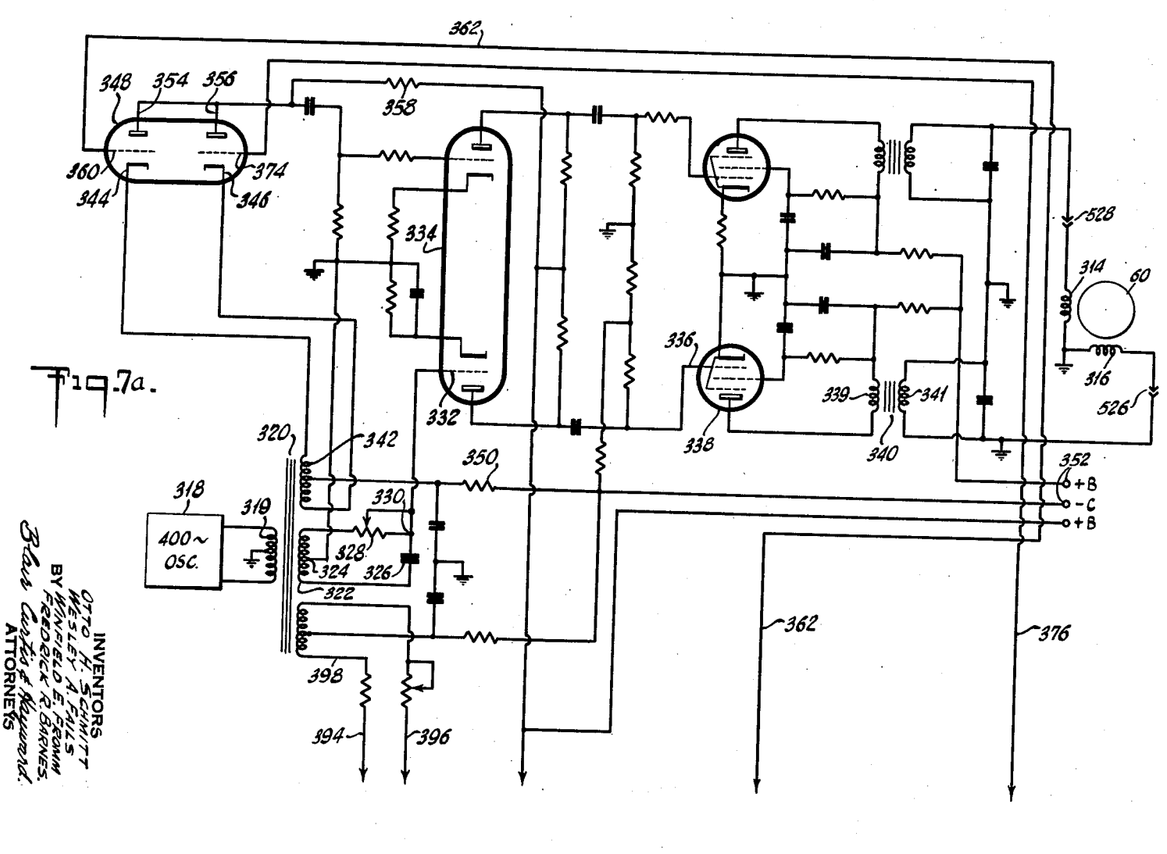
Figures 7a and 7b are schematic diagrams of portions of the pen servo amplifier.
Figure 7B:
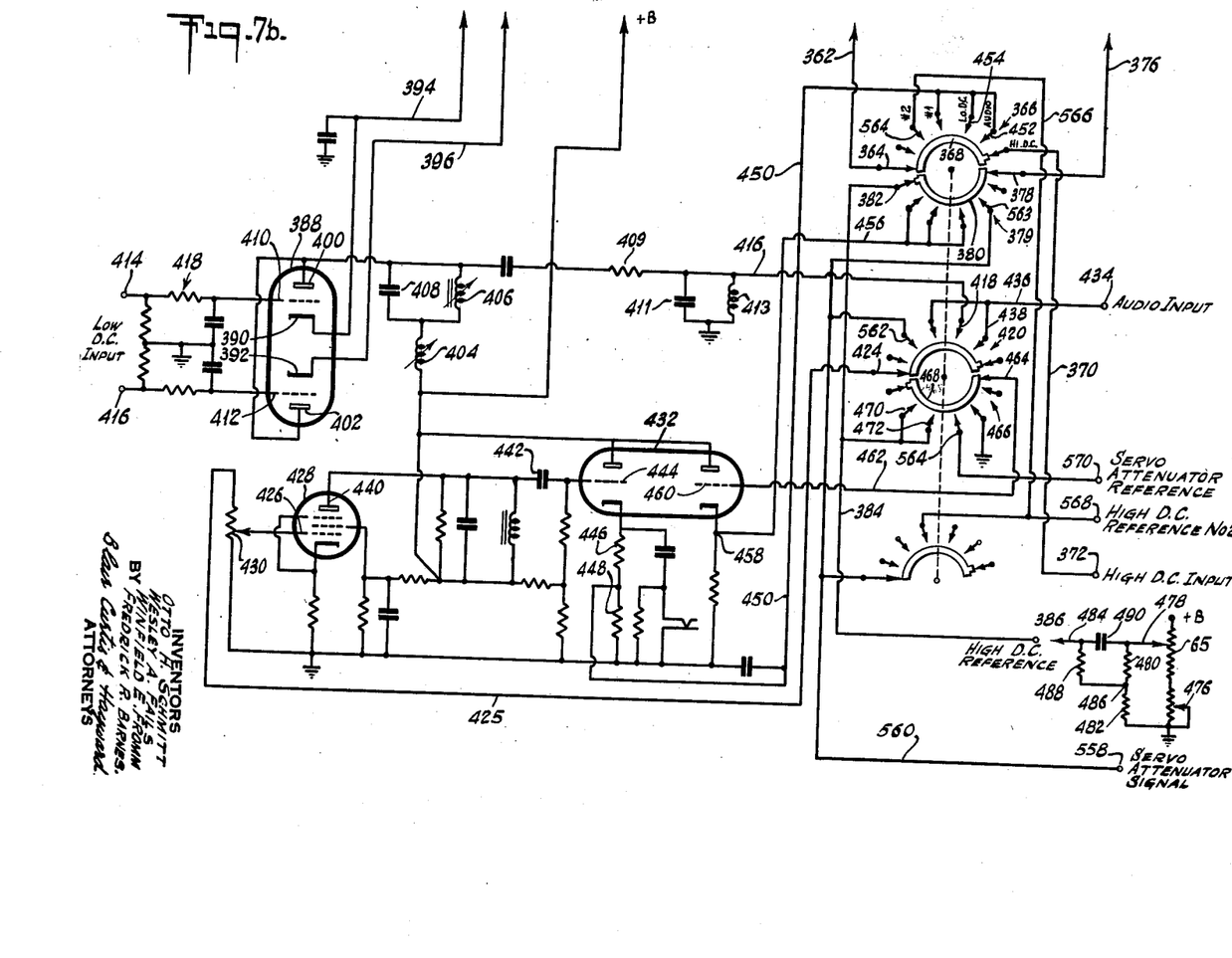

The servomotor 60 (Figure 2) which drives the recording pen 20 is supplied power by a pen servo amplifier shown in Figures 7a and 7b. The servomotor 60 (Figure 7a) is a two-phase reversible motor, the direction of rotation of which depends upon the phase relationship of the two quadrature voltages that are applied to its field windings 314 and 316. Both of these voltages are developed by an oscillator 318, which, for example, generates a 400-cycle voltage. The voltage thus developed is shifted in phase by 90 degrees and applied to the winding 316 of servomotor 60. It is applied also to the winding 314 in such phase as to rotate servomotor 60 and drive pen 20 to a position in accordance with the appropriate coordinate of the data to be recorded.

The 400-cycle oscillator 318 is connected across the primary winding 319 of a transformer 320; the secondary winding 322 of transformer 320 is provided with a center-tap 324 connected to ground and its ends are connected across a phase shift circuit comprising a condenser 326 and variable resistance 328. The values of condenser 326 and resistor 328 are chosen to produce a 90 degree phase shift at the output terminal 330 of the network, and the signal occurring at this point is impressed upon a control grid 332 of one section of a dual triode vacuum 334. This tube functions as a voltage amplifier and its output circuit is coupled to a control grid 336 of a pentode type vacuum tube 338, which is connected as a power amplifier. The plate load for tube 338 includes a primary winding 339 of an output transformer 340, the secondary winding 341 of which is connected to the winding 316 of servomotor 60. Thus, the 400 cycle signal is shifted in phase 90 degrees by the network 326, 328, amplified by the tubes 334 and 338 and coupled to the winding 316 of servomotor 60.

The terminals of another secondary winding 342 of transformer 320 are connected to the two cathodes 344 and 346 of a dual triode vacuum tube 348, and the center tap of secondary winding 342 is returned to an external source of negative bias voltage (not shown) through a high series resistance 350 and the terminal 352. Thus, the two cathodes 344 and 346 have alternating components of bias voltage which are 180 degrees out of phase. The plates 354 and 356 of tube 348 are connected together and have a common plate load resistance 358. If the two sections of tube 348 have equal D.-C. grid biases, the voltages developed across the plate load resistance 358 as a result of current flow in each section of tube 348 will be equal to and 180° out of phase with the voltage developed because of current flow in the other section of tube 348, so that the two voltages will cancel and no 400 cycle signal will appear across resistance 358. If, however, there is a disparity between the D.-C. voltages applied to the grids of the two sections of tube 348, a 400 cycle voltage will be developed across resistance 358, its phase depending upon which section of tube 348 has the greater transconductance, and its magnitude depending upon the relative plate currents of the two sections.

The grid 360 of the left-hand section of tube 348 is connected through a lead 362 to the wiping contact 364 (Figure 7b) of one section 366 of a five-section, six-position rotary switch. In position one of this switch, which position is referred to as the "high D.-C." position, the rotary arm 368 of section 366 of the switch is connected through a lead 370 to the terminal 372 which serves as an input terminal for high D.-C. control signals. The grid 374 (Figure 7a) of the right-hand section of tube 348 is connected through a line 376 with the wiping contact 378 (Figure 7b) of a second section 379 of the switch. In the high D.-C. position, the rotary arm 380 of this section of the switch engages a fixed contact 382 which is connected through a line 384 with the terminal 386 which serves as the input terminal for high D.-C. reference voltages. When the system is used in connection with a high D.-C. input signal, terminal 386 is connected to the sliding contact 478 of the follow-up potentiometer 65 in the pen servo amplifier. This connection is indicated in Figure 7b. As may be seen, one terminal of follow-up potentiometer 65 is connected to a source of positive voltage and its other end is connected through a resistor 476 to ground. At the sliding contact 478 of the potentiometer 65 there will be developed a D.-C. voltage of amplitude dependent upon the setting of potentiometer 65, which in turn varies in accordance with the position of pen 20. The sliding contact 478 is connected through a pair of voltage divider resistances 480 and 482 to ground. The line 384, which is connected to the high D.-C. reference input terminal 386, is connected to the junction 486 of resistances 480 and 482 through a resistance 488, and to the sliding contact 478 through a capacitance 490. The impedances of this RC circuit are such that the voltage in line 384 slightly leads in phase that developed at sliding contact 478. This counteracts the slight lag imposed as this voltage by the balance of the system and accordingly prevents any tendency toward oscillation in the system.

The high D.-C. input terminal 372 is connected to a source of D.-C. voltage of amplitude varying in accordance with the appropriate coordinate of the data to be recorded. Where the system is used for plotting the field patterns of antennas, for example, the terminal 372 may be connected to the detector of a radio receiver, where there is developed a positive voltage of amplitude varying with the field strength of the radio frequency signal.

When the position of pen 20 is such that the voltage developed in the follow-up potentiometer 65 is unequal to that developed in the detector of the radio receiver, there is developed in tube 348 (Figure 7a) and furnished to the winding 314 of servomotor 60 a 400 cycle voltage of such phase as to drive servomotor 60 to re-position pen 20 and the follow-up potentiometer 65 until the high D. C. reference voltage and the high D. C. input voltage are equalized. Accordingly, the position of pen 20 is at all times dependent upon the strength of the radio frequency field.

To adapt the pen servo amplifier for a wide variety of applications, facilities are provided also for various types of input voltages, including audio frequency voltages of amplitude proportional to the data to be recorded. An example of such a voltage is that developed by the detector of a radio receiver used to detect a radio frequency field wherein the radio frequency carrier is modulated by an audio frequency signal. This A.-C. input voltage is amplified and detected or rectified, and the resulting D.-C. voltage is utilized to control the high D.-C. modulator tube 348.

Terminal 434 (Figure 7b) is provided for such input signals. This terminal is connected, by lead 436, with a fixed contact 438 of the third section 420 of the input selector switch. In position two—referred to as the "audio" position—of the switch, contact 438 is engaged by the rotary arm 422 of this section of the switch.

Rotary arm 422 is in turn engaged by the wiping contact 424 which is connected by a lead 425 to the control grid 426 of a pentode vacuum tube 428 through a potentiometer 430. Tube 428 amplifies this A.-C. input voltage, and the resulting amplified voltage at the plate 440 is coupled through a condenser 442 to the grid 444 of one section of a dual triode vacuum tube 432. This section of tube 432 functions as an infinite impedance detector. The detector output signal is coupled from the junction of cathode resistances 446 and 448 through the lead 450 to a pair of fixed contacts 452 and 454 in the section 366 of the input selector switch. In position two— the "audio" position of the switch, the D.-C. voltage developed at the cathode of the detector section of tube 432 is applied through contact 452, rotary arm 368, contact 364 to the lead 362 which is connected to the grid 360 of the high D.-C. modulator tube 348. As previously mentioned, the other grid 374 of tube 348 is connected through a lead 376 and the wiping contact 378 to the rotary arm 380 of the second section 379 of the input selector switch. In positions two, three and four of the switch, arm 380 is in engagement with contacts which are attached to a common lead 456 which is connected to the cathode 458 of the remaining section of tube 432. This section functions as a cathode follower, and its grid 460 is connected through a lead 462 with the wiping contact 464 of the fourth section 466 of the input selector switch. In positions two and three of the switch, the rotary arm 468 of this section engages fixed contacts 470 and 472, respectively, which are connected through the lead 384 with the high D.-C. reference input terminal 386. As described, this terminal is normally connected to the pen servo follow-up potentiometer 65, so that a D.-C. voltage varying with the position of the pen 20 is applied to the grid 460 of the right-hand section of tube 432. The voltage developed at the cathode 458 of this section varies accordingly. The passage of this high D.-C. reference signal through the cathode follower circuit and the resulting variation of such signal in accordance with fluctuations in the plate and filament supply voltages of tube 432 serves the purpose of counteracting any variations in the amplitude of the detected audio frequency signal due to such fluctuations in the supply voltages of the tubes of the servo amplifier through which the latter signal is passed.

Another type of input signal for which the pen servo amplifier provides facilities is a D.-C. voltage of lower amplitude. An example of such a voltage is that developed in the automatic volume control circuit of a radio receiver, which voltage is proportional to the strength of the radio frequency field detected by the receiver. The pen servo amplifier provides circuits for using this lower D.-C. voltage to modulate a 400-cycle signal, amplifying this signal, rectifying it, and supplying the D.-C. voltage thus developed to the high D.-C. modulator tube 348, which together with the subsequent amplifier circuits functions in the manner previously described.

A dual triode vacuum tube 388 (Fig. 7b) is utilized as the low D.-C. modulator. The cathodes 390 and 392 of tube 388 are connected through leads 394 and 396, respectively, across a third secondary winding 398 (Figure 7a) of transformer 320. Accordingly, as in the high D.-C. modulator 348, the cathodes 390 and 392 are supplied 400-cycle voltages 180 degrees out of phase.

The plates 400 and 402 of tube 388 are connected together and have a common series-parallel tuned load consisting of variable inductances 404 and 406 and capacitance 408. The voltage developed across this load will be of amplitude depending upon the difference in potential applied to the grids 410 and 412 of tube 388. These grids are connected, respectively, to input terminals 414 and 416 through a balanced R-C network, generally indicated at 418. The provision of two input terminals allows even greater flexibility for the system, adapting it for operation with an input consisting of two D.-C. voltages, the difference between which is proportional to an appropriate coordinate of the data to be recorded. Such voltages are developed, for example, in the automatic volume control circuits of certain commercially available radio receivers.

Where there is available an input signal consisting of a single D.-C. voltage varying with respect to ground, only one of the grids of the low D.-C. modulator tube 388 is employed, and each section of the tube develops an alternating voltage whose amplitude is proportional to that of the input voltage.

In order that tube 388 will function as a linear converter to provide an alternating signal that is proportional at all signal levels to the input D.-C. signal, an arrangement is provided to suppress the second harmonic component of the A.-C. signal developed by the modulator 388, such as may be caused by non-linearity of the tube characteristics, the plate load circuit 404, 406, 408 is tuned so that capacitance 408 and inductance 406 form a parallel resonant circuit at 400 cycles per second, providing a high load impedance with accompanying high gain at this frequency. This parallel circuit in conjunction with the inductance 404, however, forms a series resonant circuit at 800 cycles per second with correspondingly low impedance and low gain for the second harmonic components of the signal. Additional filtering is provided by the parallel capacitance 409 and inductance 411 and resistance 413, this circuit being tuned for resonance at 400 cycles per second. The output signal is connected through a lead 416 with a fixed contact 418 in a third section 420 of the input selector switch. In position three—referred to as the "low D.-C." position—of this switch, contact 418 is connected through the rotary arm 422 of section 420 of the switch, and lead 425 to a grid 421 of a voltage amplifier tube 428. The A.-C. voltage is amplified by the tube 428 and rectified by the detector tube 432 and the resulting D.-C. voltage is used to control the high D.-C. modulator tube in the manner previously described.

Figure 8:
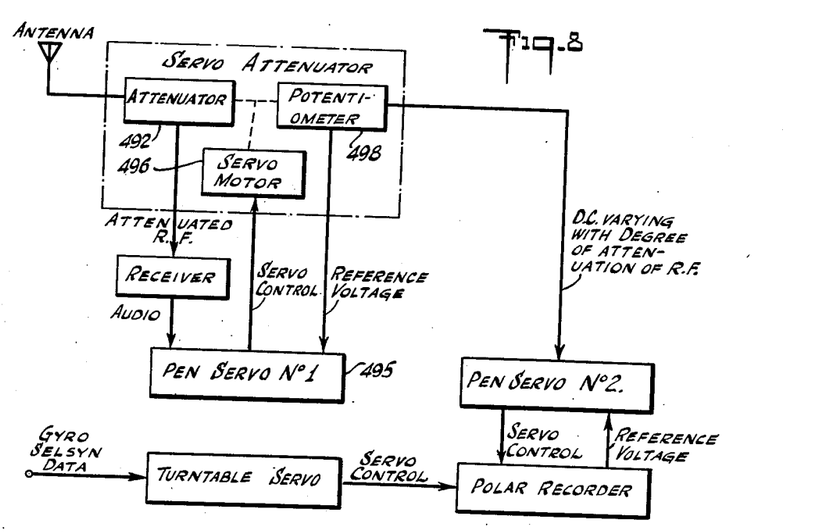
Figure 8 is a block diagram of a system embodying the present invention and adopted for measurement of the strength of a radio-frequency field; and, Figure 9 is a schematic diagram of the servo attenuator of the system shown in Figure 8.

Figure 8 illustrates an arrangement of the system by which there may be achieved an unusually accurate measurement of the strength of radio frequency fields. The signal induced in the antenna is passed through a variable attenuator 492, and amplified and detected by a receiver 494; the resulting audio signal (where the radio signal frequency is unmodulated, the beat-frequency oscillator is utilized to produce an audio signal) is connected to the audio input of a first pen servo amplifier unit 495. This pen servo amplifier controls a servomotor 496 which is coupled to drive the attenuator 492 and a follow-up potentiometer 498. The voltage developed by the follow-up potentiometer, which voltage is dependent upon the degree of attenuation effected by attenuator 492 upon the incoming radio frequency signal, is used as a high D.-C. input to a second pen servo amplifier unit. This pen servo amplifier is used to control the radial position of the pen 20 of the polar recorder, in the manner previously described. The turntable of the recorder is controlled by means of a turntable servo amplifier also as described above.

Figure 9:
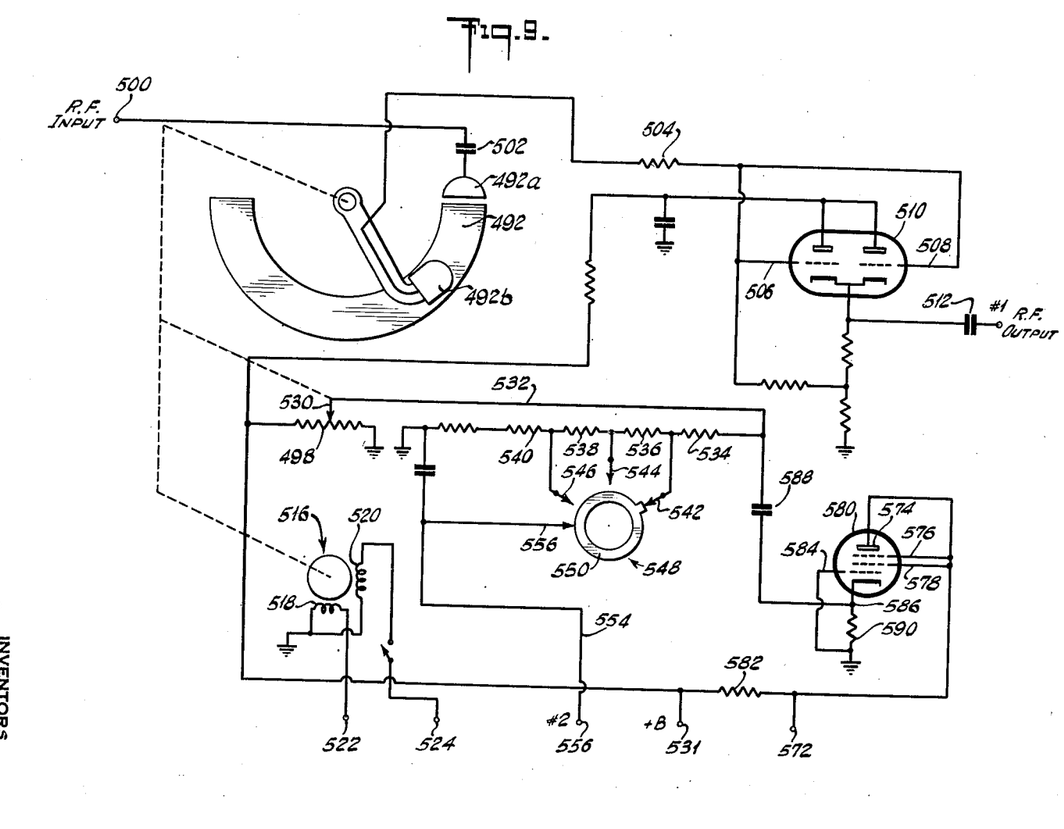

Figure 9 is a schematic diagram of the servo radio frequency input attenuator unit. The radio frequency input terminal 500 is connected through a capacitance 502 to the input coupler 492a of the radio frequency attenuator 492, which may suitably be of the piston type, wherein the degree of attenuation imposed upon the radio frequency signal is dependent upon the spacing of the piston 492b from the input coupler 492a. Piston 492b is connected through a resistance 504 to the grids 506 and 508 of a dual triode vacuum tube 510, the two sections of which are connected in parallel. The tube 510 functions as a cathode follower, its cathodes being connected through a capacitance 512 with the radio frequency output terminal 514.

The piston 492b of attenuator 492 is coupled to be driven by a servomotor 516. The two field windings 518 and 520 of servomotor 516 are connected, respectively, through terminals 522 and 524 of the servo attenuator, and the terminals 526 and 528 (Figure 7a) of the pen servo amplifier, to the output transformers of the first pen servo amplifier so that this pen servo amplifier will drive servomotor 516.

Servomotor 516 is coupled also to drive the sliding contact of the follow-up potentiometer 498. One end of potentiometer 498 is grounded and its opposite end is connected through a terminal 531 to a regulated source of positive voltage. Thus, there is developed at the sliding contact 530, a positive voltage dependent upon the position of attenuator piston 492b—i. e., upon the degree of attenuation imposed by the attenuator upon the incoming radio frequency signal. The sliding contact 530 is connected through a lead 532 with a voltage divider network comprising resistances 534, 536, 538 and 540; the junctions of these resistances are connected to the fixed contacts 542, 544 and 546 of a rotary switch 548.

The rotary arm of this switch is engaged by a wiping contact 552 which is connected through a lead 554 to an output terminal 556.

When the pen servo amplifier is utilized as the pen servo No. 2 of the system shown in Figure 8, its servo attenuator signal input terminal 558 (Figure 7b) is connected to the terminal 556 (Figure 9). The terminal 558 is in turn connected through a lead 560 with a fixed contact 563 in the second section 379 of the input selector switch, which contact is engaged by the rotary arm 380 of this section in position 5, referred to as the "No. 2 pen servo" position, of the switch. As described, the rotary arm 380 is connected through the wiping contact 378 with the grid 374 (Figure 7a) of the high D.-C. modulator tube 348.

In the same position of the selector switch, the grid 360 of tube 348 is connected through line 362, wiping contact 364 (Figure 7b) and rotary arm 368 to the fixed contact 564 of the first section 366 of the switch. This contact is connected through a line 566 to the No. 2 high D.-C. reference terminal 568. Accordingly, when the pen servo is used as the No. 2 pen servo, the turntable servo follow-up potentiometer 65 and its associated circuit, shown in the lower right-hand corner of Figure 7b, is connected to the terminal 568 so that the follow-up potentiometer furnishes the reference voltage to the grid 360 (Figure 7a) of tube 348.

When the pen servo amplifier is used as the No. 1 pen servo amplifier of the system shown in Figure 8, the input selector switch is set in position 4, which is referred to as the "pen servo No. 1" position. In such position, the first two sections 366 and 379 of the input selector switch connect the two grids of the high D.-C. modulator tube 348 to the output of the detector and cathode follower sections, respectively, of tube 432, which sections function as previously described. The inputs to these tubes are controlled by the third and fourth sections 420 and 466 of the input selector switch, and in position 4 of the switch, are connected, respectively, to the audio input terminal 434 and to the servo attenuator reference input terminal 570. The terminal 434 is, in such arrangement, connected to the output of the radio receiver 494 (Figure 8). The terminal 570 is connected to the terminal 572 (Figure 9) of the servo attenuator. This terminal 572 is connected to the plate 574, suppressor grid 576, and screen grid 578 of a triode-connected pentode vacuum tube 580. These elements of tube 580 are supplied voltage from terminal 531 through a load resistance 582. The control grid 584 of tube 580 is grounded and its cathode 586 is connected through a capacitance 588 with the sliding contact 530 of follow-up potentiometer 498. Capacitance 588 forms with the cathode resistance 590 a differentiating circuit, so that the voltage applied to a cathode 586 varies in accordance with the rate of change of voltage at contact 530. The voltage developed across the load resistance 582 and applied to terminal 572 varies accordingly. The variations in this voltage caused by rapid changes in input signal, which are of such polarity that their application to the high D.-C. modulator tube in the manner described accomplishes an inverse feed-back, or rate control, effect to substantially eliminate any tendency toward oscillation of the system.

We claim:

1. In a recorder of the type including a turntable and a pen holder movable radially thereof for inscribing a polar coordinate graph on a sheet of translucent paper bearing a central reference mark and a radial reference mark, means for centering and orienting said sheet upon said turntable comprising a record-supporting disc concentric with said turntable and rotatably mounted thereon for adjusting its orientation with respect to said turntable, a hole of relatively small diameter at the center of said turntable, a source of light positioned beneath said hole for illuminating said paper therethrough, and an angular reference alignment mark on said disc, whereby said sheet can be centered on said disc in proper orientation therewith and said disc can be angularly positioned with respect to said turntable.

2. In a recorder of the type including a turntable and a recording head movable radially thereof for impressing a polar coordinate record upon a translucent sheet bearing polar coordinate reference lines, means for positioning said sheet relatively to said turntable comprising a hole through said turntable at the axis of rotation thereof, said turntable having an outer rim with angular calibration marks therearound, a sheet supporting disc mounted upon said turntable for rotation relatively thereto about an axis coincident with said axis of rotation, an angular position reference mark on said disc arranged to cooperate with said sheet for indicating the angular position of said sheet on said disc and to cooperate with said calibration marks to indicate the orientation of said disc on said turntable, and having a small central hole therethrough at said axis, an index member rigidly centered on said recorder and cooperating with said calibration marks to indicate the angle of rotation of said turntable on said recorder, and a source of light positioned beneath said holes in said turntable and said disc for casting a ray of light therethrough to indicate correct centering of said sheet.

3. A polar graph recorder comprising a rotatably mounted turntable, a pivotally mounted arm extending radially from the outer edge substantially to the center of said turntable, a carriage movably supported on said arm, a recording pen supported by said carriage, a pen driving motor, a drum arranged to be driven by said motor, and a cable extending between said drum and said carriage for adjusting the radial position of said pen in accordance with the rotation of said motor, said cable forming loops of opposite direction around the pivotal axis of said arm to permit raising said arm above said turntable without changing the effective length of said cable or shifting the calibration of the instrument.

4. A polar graph recorder comprising a rotatably mounted turntable, an arm extending radially from the outer edge substantially to the center of said turntable, said arm being pivotally mounted so as to be swung from the surface of said turntable, a carriage supported on said arm for radial motion therealong adjacent the surface of said turntable, a recording element supported by said carriage, a motor for driving said carriage along said arm, a drum arranged to be driven by said motor, and a cable secured to said drum and said carriage for moving said carriage, said cable forming loops passing around the pivotal axis of said arm in opposite directions to permit said arm to be swung from said turntable without changing the effective length of said cable or disturbing the calibration of said instrument.

References Cited in the file of this patent

UNITED STATES PATENTS

| Number | Name | Date |
|---|---|---|
| 93,931 | Westcott | Aug. 17, 1869 |
| 1,720,148 | Rodanet | July 9, 1929 |
| 1,975,023 | Sertillage | Sept. 25, 1934 |
| 2,074,116 | Stein | Mar. 16, 1937 |
| 2,074,117 | Ross | Mar. 16, 1937 |
| 2,165,510 | Rosene | July 11, 1939 |
| 2,191,277 | George | Feb. 20, 1940 |
| 2,376,359 | Hultin | May 22, 1945 |
| 2,385,641 | Peterson | Sept. 25, 1945 |
| 2,406,143 | Godet | Aug. 20, 1946 |
| 2,414,221 | Bristol | Jan. 14, 1947 |
| 2,414,384 | Moseley | Jan. 14, 1947 |
| 2,417,339 | Woolley | Mar. 11, 1947 |
| 2,417,496 | Huebner | Mar. 18, 1947 |
| 2,446,188 | Miller, Jr. | Aug. 3, 1948 |
| 2,463,527 | Dunmore | Mar. 8, 1949 |
| 2,475,573 | Smith et al. | July 5, 1949 |
| 2,485,663 | Rusch et al. | Oct. 25, 1949 |